United States Patent
Bengtsson et al.

(10) Patent No.: US 11,181,631 B2
(45) Date of Patent: Nov. 23, 2021

(54) RADAR-ASSISTED TRACKING OF MOBILE DEVICES TO IMPROVE THE COMMUNICATION LINK IN HIGH FREQUENCY COMMUNCIATION

(71) Applicant: SONY MOBILE COMMUNICATIONS INC., Tokyo (JP)

(72) Inventors: Erik Bengtsson, Eslöv (SE); Zhinong Ying, Lund (SE)

(73) Assignee: Sony Group Corporation, Tokyo (JP)

( * ) Notice: Subject to any disclaimer, the term of this patent is extended or adjusted under 35 U.S.C. 154(b) by 260 days.

(21) Appl. No.: 16/338,203

(22) PCT Filed: Nov. 22, 2016

(86) PCT No.: PCT/US2016/063352
§ 371 (c)(1),
(2) Date: Mar. 29, 2019

(87) PCT Pub. No.: WO2018/097817
PCT Pub. Date: May 31, 2018

(65) Prior Publication Data
US 2019/0265348 A1 Aug. 29, 2019

(51) Int. Cl.
*G01S 13/72* (2006.01)
*G01S 13/76* (2006.01)
(Continued)

(52) U.S. Cl.
CPC .............. *G01S 13/72* (2013.01); *G01S 13/10* (2013.01); *G01S 13/76* (2013.01); *G01S 13/86* (2013.01);
(Continued)

(58) Field of Classification Search
CPC .......... G01S 13/72; G01S 13/86; G01S 13/10; G01S 13/76; G01S 2013/9316;
(Continued)

(56) References Cited

U.S. PATENT DOCUMENTS

2004/0063430 A1*  4/2004  Cave .................... H04W 16/28
                                                     455/436
2007/0149196 A1*  6/2007  Choi ................. H04W 36/0005
                                                     455/436
(Continued)

FOREIGN PATENT DOCUMENTS

EP        2861014 A1    4/2015
WO     2013089733 A1    6/2013

OTHER PUBLICATIONS

Aki Hakkarainen, High-Efficiency Device Localization in 5G Ultra-Dense Networks: Prospects and Enabling Technologies, 2015 IEEE 82nd Vehicular Technology Conference (VTC2015—Fall), Sep. 6, 2015, pp. 1-5, IEEE, Boston, MA, USA.

*Primary Examiner* — Minjung Kim
(74) *Attorney, Agent, or Firm* — Renner, Otto, Boisselle & Sklar, LLP

(57) ABSTRACT

Pulse signal transmission, such as radar pulses or the like are used in a high frequency mobile communication network as a means for determining or assisting in determining the likely presence of User Equipment (UE) and/or tracking UE in a predetermined area. As a result of determining the likely presence of UE and/or tracking UE, such information may be used to expedite either a handover or establish re-connection within the communication network. In this regard, more targeted beam sweeps or more frequent sweeps can be made in the direction where the UE has been determined to likely be present in order to hasten the establishment of the communication link between the targeted transmission point, such as a Base Station (BS) or the like, or reconnection to the existing transmission point.

19 Claims, 5 Drawing Sheets

(51) Int. Cl.
*G01S 13/86* (2006.01)
*G01S 13/10* (2006.01)
*H04W 64/00* (2009.01)
*G01S 13/00* (2006.01)
*H04W 36/32* (2009.01)
*G01S 13/931* (2020.01)
*H04W 4/029* (2018.01)
*H04W 16/28* (2009.01)

(52) U.S. Cl.
CPC ......... *H04W 64/003* (2013.01); *G01S 13/003* (2013.01); *G01S 2013/9316* (2020.01); *H04W 4/029* (2018.02); *H04W 16/28* (2013.01); *H04W 36/32* (2013.01)

(58) Field of Classification Search
CPC ... G01S 13/003; H04W 64/003; H04W 4/029; H04W 16/28; H04W 36/32
See application file for complete search history.

(56) References Cited

U.S. PATENT DOCUMENTS

| | | | |
|---|---|---|---|
| 2015/0092676 A1* | 4/2015 | Periyalwar | H04W 4/18 370/329 |
| 2015/0245251 A1 | 8/2015 | Somayazulu et al. | |
| 2015/0373593 A1* | 12/2015 | Ryu | H04W 24/10 370/332 |
| 2016/0161604 A1* | 6/2016 | Clark | G01S 13/4418 342/154 |
| 2016/0165605 A1 | 6/2016 | Dimou et al. | |
| 2019/0162817 A1* | 5/2019 | Priyanto | H04B 1/713 |

* cited by examiner

RADAR-ASSISTED TRACKING OF MOBILE DEVICES TO IMPROVE THE COMMUNICATION LINK IN HIGH FREQUENCY COMMUNCIATION

RELATED APPLICATIONS

This application is a national phase entry of International Application No. PCT/US2016/063352 filed on Nov. 22, 2016 and published in the English language, which is hereby incorporated by reference.

FIELD OF THE INVENTION

In general, embodiments of the invention relate to mobile network telecommunications and, more particularly, methods, apparatus, systems and the like for using radar to track the position or movement of User Equipment (UE) in a communication network by determining the likely presence of the UE in a predetermined area covered by the network. In specific embodiments of the invention such presence information and/or tracking information may be used to assist in a handover procedure and/or establishing a re-connection in the event a connection has been or is about to be lost.

BACKGROUND

In impending mobile networks, such as 3GPP (Third Generation Partnership Project) NR (New Radio) or the like, the use of higher frequency operation, such as operation at or above 20 GHz (Giga Hertz), is being considered. In one such mobile network, use of millimeter (mm) waves, which occupy the frequency spectrum from 30 GHz to 300 GHz is considered. Such higher frequency operation benefits from the available bandwidth, which enables massive peak data rates for users of such mobile networks. However, higher frequency operation also presents challenges, which are not necessarily present when operating at conventionally lower frequency.

One of the additional challenges presented by higher frequency operation comes from the fact that the electromagnetic waves (EM-waves) tend to behave different at higher frequencies. The scattering of the EM-waves is less and diffraction is reduced, which results in the radiation becoming more directive.

As a consequence of less scattering and reduced diffraction, communication systems that implement higher frequencies may need multiple base stations (BSs) (otherwise referred to herein as transmission points (TPs)) to cover an area that is conventionally, in lower frequency network operation, covered by a single BS. This is because less scattering and reduced diffraction results in what is commonly referred to as "shadowing" or "shadow fading". Shadowing refers to the inability of a signal to reach its intended destination, such as a UE, because obstacles located between the UE and transmission point (e.g., BS) block or otherwise affect the wave propagation. Since, higher frequency signals are more reflective, higher frequency signals will not typically penetrate (i.e., pass through) bodies, objects or the like. Shadowing may be the result of what is referred to as dynamic blockage in which movement of vehicles or humans into the direct line-of-sight between the UE and the transmission point causes shadowing to occur. In other instances, the mere rotation of the UE may dramatically change the angle of arrival and/or departure from the UE and, if the transmission point (i.e., beam tracking in the BS or the like) cannot catch up with the rotational speed of the UE, the communication link between the TP and the UE may be significantly reduced and/or lost. Thus, while shadowing (e.g., dynamic blockage) and/or UE movement/rotation is typically not an issue in lower frequency operation, shadowing becomes much more prevalent at higher frequency operation. As a result of the reflective nature of the higher frequency signals, a direct line-of-sight between the antennas of the UE and the antennas of the transmission point are desired to insure signal reception. Thus, in order to compensate for the fact that users of UEs frequently move (i.e., change direction) and thus may cause shadowing to occur (i.e., the user positions themselves between the UE and the transmission), the area in which the UE resides needs to be covered by multiple base stations in order cover the area from different angles.

In this regard, if a user moves (i.e., turns around or the like) such that shadowing results, an alternative BS/TP covering the area should be ready for a handover to occur (i.e., transfer of the wireless data stream from one direction to another direction). Alternatively, if the antenna in the UE are turned in the wrong direction (i.e., a direction that is not consistent with the direction of the antenna in the serving BS/TP), the alternative BS/TP may be needed because antenna directivity is larger and often limited at higher frequencies, such as, for example, frequencies in the range 30-100 GHz.

A challenge in such higher frequency mobile networks is that when shadowing occurs and a BS/TP loses the connection with the UE or is about to lose the connection, one of the alternative BSs/TPs needs to be ready to make a connection with the UE. In this regard, the handover process needs to be instantaneous and seemingly transparent to the user of the UE.

As such, a need exists to track position and/or movement of UEs over time or otherwise determine the presence of the UEs within a predetermined area of a communication network, so as to assist in expediting a handover procedure in the event that a connection is lost or is about to be lost (i.e., deteriorating signal or the like). Such expediting of the handover procedure can be realized if the alternative transmission point/BS knows which direction to look at (i.e., which direction to scan in) for the purpose of initiating communication with the UE that the targeted/neighboring BS/TP is attempting to (or will attempt to) establish a communication link.

BRIEF SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing methods, apparatus, systems or the like for using radar, or some other form of pulse signals, to track a UE in a mobile communication network by determining the likely presence of a UE (User Equipment) within a predetermined area (e.g., the area at which the pulse signals are directed). In specific embodiments of the invention, the aforementioned methods, apparatus and the like are used in conjunction with higher frequency operating mobile communication networks, such as networks operating at or above 20 GHz (Giga Hertz).

Further, use of pulse signals, such as radar pulses, pilot pulses or the like which allow for determination of the likely presence of a UE and/or tracking information associated with the UE (e.g., position, direction of movement, rate/ speed of movement and the like) has the additional benefit of saving beam synchronization power consumption. Such a power consumption savings is especially beneficial at the UE, since reducing synchronization power consumption provides for additional battery life.

In further embodiments of the invention, radar or other forms of pulse signals may be used to determine or assist in determining the physical location of the UE or the direction of movement of the UE. While in other embodiments of the invention, radar or other forms of pulse signals may be used to track or assist in the tracking of the state of the UE. For example, tracking the position of the UE, the direction of movement of the UE and/or speed/rate of movement of the UE. In further embodiments of the invention, radar or other forms of pulse signals may be used to predict a future state of the UE based on tracking the state of the UE over time (i.e., tracking echo profiles of a UE). For example, predicting the future state may include predicting a future position of the UE, predicting a future direction of movement and/or predicting a future speed/rate of movement based on tracking the state of the UE over time.

In specific embodiments of the invention, radar or other forms of pulse signals are used to assist in handover procedures (i.e., moving a data stream from a first direction to a second direction). The handover procedure may be transmission point-to-transmission point (TP-to-TP) (e.g., base station-to-base station (BS-to-BS), access point-to-access point (AP-to-AP) or the like) or internal with a single BS employing multiple radio heads (radio head-to-radio head) or the like. In this regard, as a result of determining the likely presence of a UE in a specific area based on the echo signals and confirming the presence, neighboring TPs/BSs/APs/ radio heads may receive presence information that indicates the presence of the UE in the specific area. As a result of receiving the presence information, the neighboring TPs/ BSs/APs/radio heads know the proximate direction at which the UE is likely located and can increase beam sweep frequency in that specific area (i.e., in the proximate direction at which the UE is located) in order to expedite initializing a communication link with the UE. In this regard, the information resulting from employing radar or some other pulse signal serves to assist in accelerating handover and/or reconnection procedures, which may be more prevalent in higher frequency operating communication networks due to the aforementioned shadowing phenomena.

A method for tracking a User Equipment (UE) in a mobile communication network defines first embodiments of the invention. The method includes transmitting, from a transmission point (e.g., Base Station (BS), access point, radio head or the like), one or more pulse signals in a predetermined direction associated with the predetermined area and, in response to transmitting the pulse signals, receiving, at the transmission point, pulse response signals associated with one or more objects. The method further includes determining the likely presence of at least one UE within the predetermined area based at least on one or more of the objects associated with the echo signals likely being the at least one UE.

In specific embodiments of the invention, the mobile communication network further comprises a mobile communication network operating at or above a frequency of 20 Gigahertz. In other specific embodiments of the method the pulse signals are transmitted at a same frequency as an operating frequency of the mobile communication network, while in other embodiments of the method, the pulse signals are transmitted at a wider frequency range than an operating frequency of the mobile communication network.

In further embodiments of the method, the pulse signals comprise radar pulses and the pulse response signals include echo signals. While in other embodiments of the method, the pulse signals may comprise one of pilot signal pulses (e.g., sounding reference signal pulses or the like). In such embodiments of the method, in which the pulse signals may comprise pilot signal pulses, the pulse response signals may be configured to provide for at least one of (i) indication of the presence of a corresponding UE within the predetermined area, or (ii) initiation of a communication link between the corresponding UE and the transmission point.

In further embodiments the method includes confirming a presence of the at least one UE in the predetermined area based on at least one of (i) receiving a signal from the at least one UE that indicates the presence of the at least one UE in the predetermined area or initiates a communication link between the at least one UE and the transmission point, or (ii) a communication link existing between the at least one UE and the transmission point.

In other specific embodiments the method includes determining at least one (i) a physical location and/or (ii) a direction of movement of the at least one UE based at least in part on the pulse response signals. In other specific embodiments the method includes tracking a movement of the at least one UE based at least in part on the pulse response signals, including at least one of tracking (i) location, (ii) a speed/rate of movement or (iii) direction of movement of the UE based at least in part on the pulse response signals.

In other specific embodiments the method includes predicting a future state of the at least one UE based at least in part on the pulse response signals, including at least one of a future (i) position, (ii) direction of movement or (iii) speed/rate of movement of the UE based at least in part on the pulse response signals.

In yet other specific embodiments the method includes generating and storing one or more UE pulse response profiles (e.g., echo profiles) for the at least one UE based on the pulse response signals, wherein the pulse response signals profiles indicate a likely presence of the at least one UE within the predetermined area over time. While in other related embodiments the method includes generating and storing a predicted UE pulse response profile for the at least one UE based at least on tracking the received pulse response signals over time.

In other embodiments the method includes communicating presence information from the transmission point to one or more other transmission points. The presence information indicates at least one of (i) likely presence of the one of the UE within the predetermined area, (ii) confirmed presence of the one of the UE within the predetermined area, and (iii) indication that the transmission point has an existing communication link with the one of the UE. While in other related embodiments the method includes communicating movement tracking information from the transmission point to one or more other transmission points and/or the UE, wherein the movement tracking information includes at least one of tracking a position of the UE, tracking a direction of movement of the UE and tracking a rate of movement of the UE.

Moreover, additional embodiments of the method include assisting in transmission point-to-transmission point handover of one of the UE based on the pulse response signals, wherein transmission point-to-transmission point handover is defined by a wireless data stream being moved from a first direction to a second direction. In such embodiments of the method assisting in the transmission point-to-transmission point handover may based at least on the likely presence of the one of the UE within the predetermined area.

In specific related embodiments of the method, assisting in the transmission point-to-transmission point handover further includes increasing beam sweep frequency in the predetermined area based on the likely presence of the one of the UE within the predetermined area. In such embodiments of the method, increasing beam sweep frequency in the predetermined area may include increasing transmission of the pulse signals in the predetermined direction associated with the predetermined area based on the likely presence of the one of the UE within the predetermined area.

In other related embodiments of the method, assisting in the transmission point-to-transmission point handover further includes communicating presence information from the transmission point to one or more other transmission points. The presence information indicates at least one of (i) likely presence of the one of the UE within the predetermined area, (ii) confirmed presence of the one of the UE within the predetermined area, and (iii) indication that the transmission point has an existing communication link with the one of the UE. In such embodiments of the method, communicating the presence information may be based on one of (i) the transmission point having a current communication link with the one of the UE, or (ii) the one of the UE communicating a signal to the transmission point that indicates presence in the predetermined area.

In other related embodiments of the invention, assisting in the transmission point-to-transmission point handover further includes communicating movement tracking information from the transmission point to one or more other transmission points, wherein the movement tracking information includes at least one of tracking a position of the UE, tracking a direction of movement of the UE and tracking a rate of movement of the UE.

In still further embodiments the method includes assisting in re-connecting one of the UE to the transmission point based on the pulse response signals. In such embodiments of the method, assisting in the re-connecting of the one of the UE to the transmission point further includes determining a direction that the UE is most likely to use to re-connect based at least on the pulse response signals.

A transmission point apparatus for determining a likely presence of a User Equipment (UE) within a predetermined area covered by a mobile communication network, defines second embodiments of the invention. The apparatus includes a memory and at least one processor in communication with the memory. The apparatus further includes a plurality of antenna, typically an array, configured for (i) transmitting one or more pulse signals in a predetermined direction associated with the predetermined area, and (ii) in response to transmitting the one or more pulse signals, receiving pulse response signals associated with one or more objects. The apparatus additionally includes a module stored in a memory, executable by the processor and configured to determine the likely presence of at least one UE within the predetermined area based at least on one or more of the objects associated with the pulse response signals likely being the at least one UE.

A system for tracking a User Equipment (UE) within a mobile communication network defines third embodiments of the invention. The system includes at least one UE located within a predetermined area of the mobile communication network. The system includes a transmission point that includes a plurality of antenna configured for (i) transmitting one or more pulse signals in a predetermined direction associated with the predetermined area, and (ii) in response to transmitting the one or more pulse signals, receiving pulse response signals associated with one or more objects. In addition the system includes a module stored in a memory, executable by a processor and configured to determine the likely presence of the least one UE within the predetermined area based at least on one or more of the objects associated with the pulse response signals likely being the at least one UE.

Thus, systems, apparatus, methods, and computer program products herein described in detail below provide for the use of radar signals or some other pulse signal transmission as a means for tracking the position and/or movement of a UE within a mobile communication network by determining the likely presence of UE in a predetermined area. As a result of implementing radar or the like to determine the likely presence and/or track the presence/position of a User Equipment (UE), such presence/tracking information may be used to expedite a handover or establish re-connection within the communication network. In this regard, more targeted beam sweeps or more frequent beam sweeps, which may include the pulse signals, can be made in the direction where the UE has been determined to be present in order to accelerate the establishment of the communication link between the targeted transmission point, such as a Base Station (BS) or the like or reconnection to the existing transmission point.

BRIEF DESCRIPTION OF THE DRAWINGS

Figure 3:
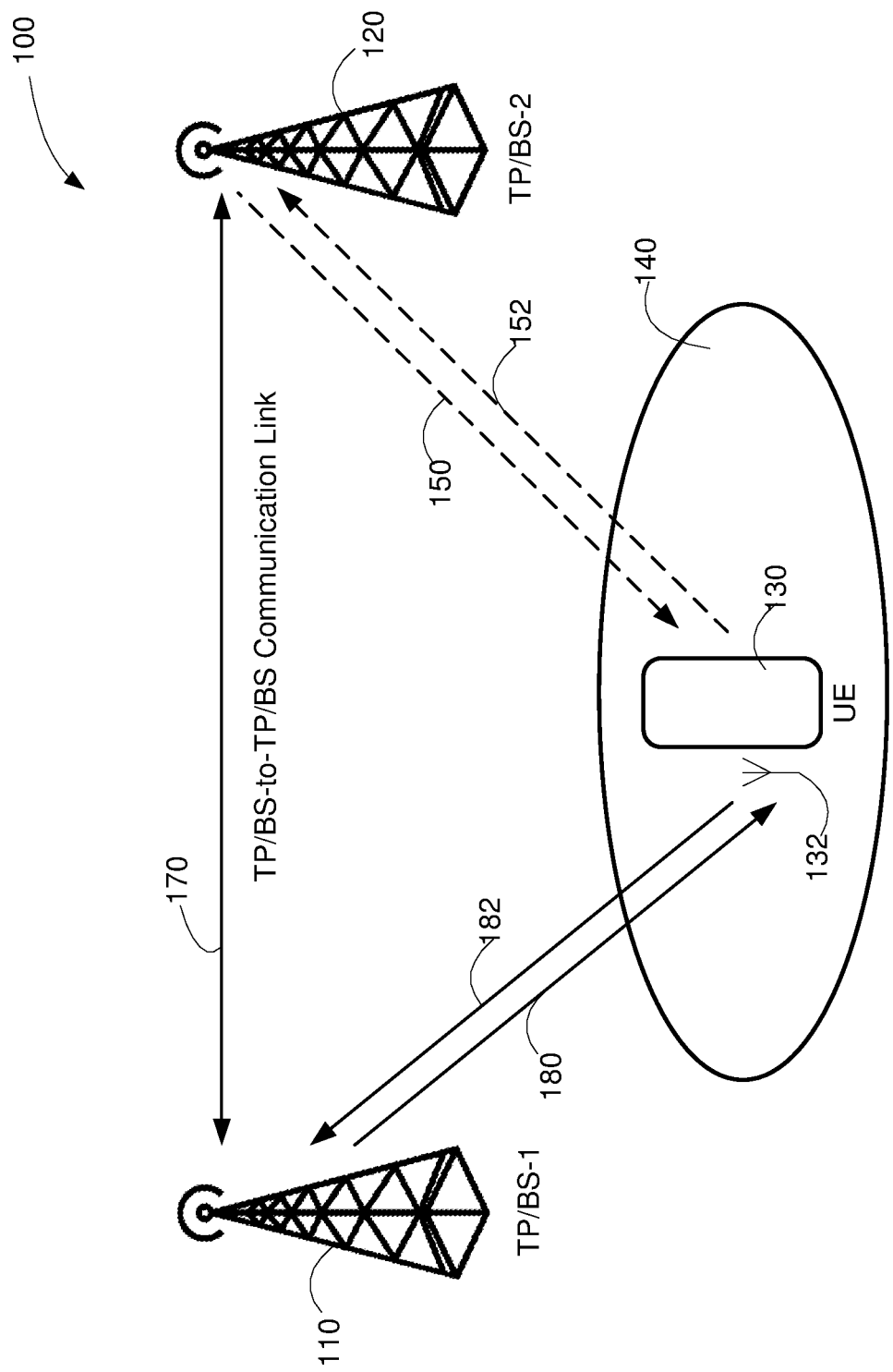
Figure 4:
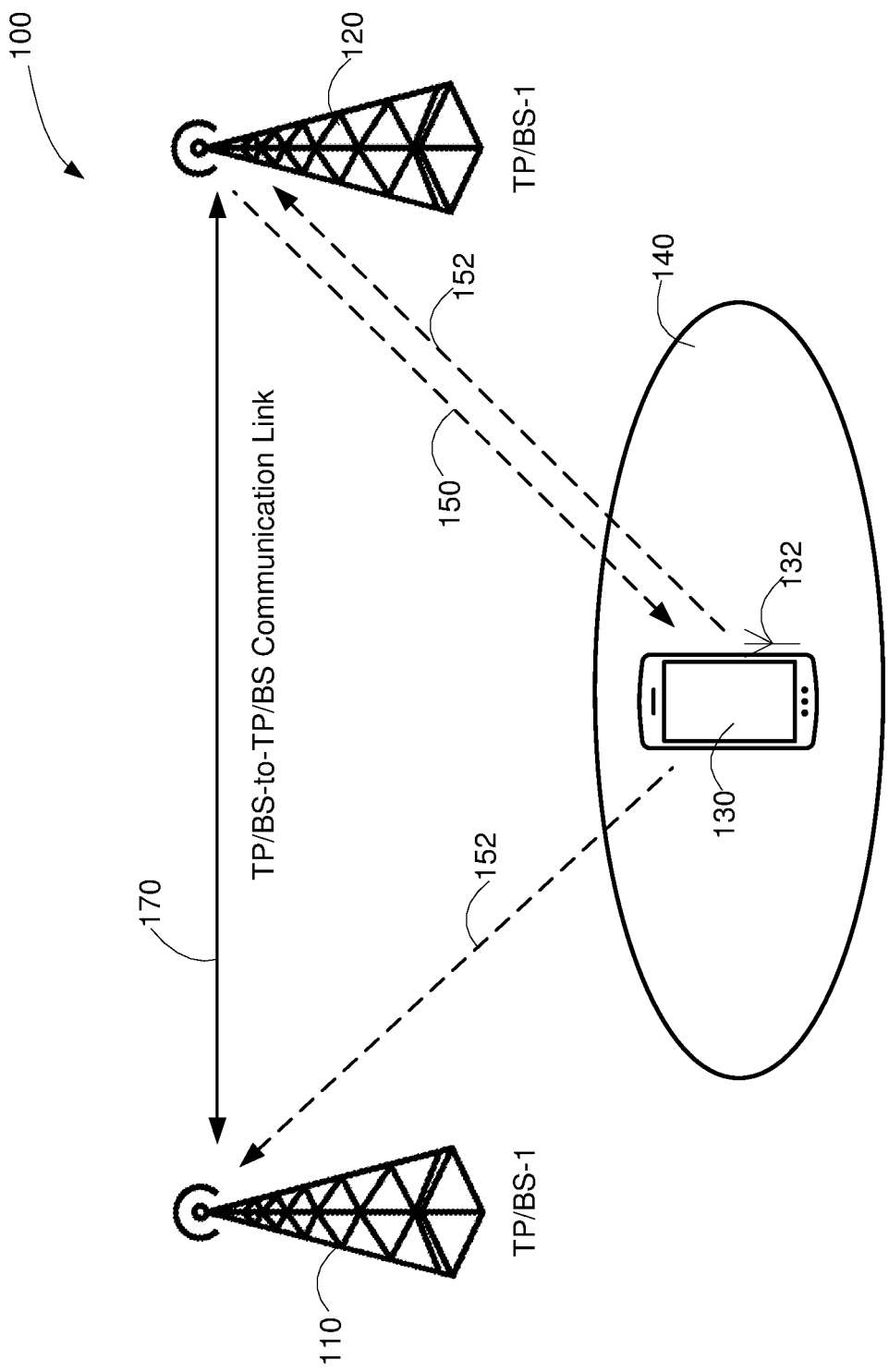
Figure 5:
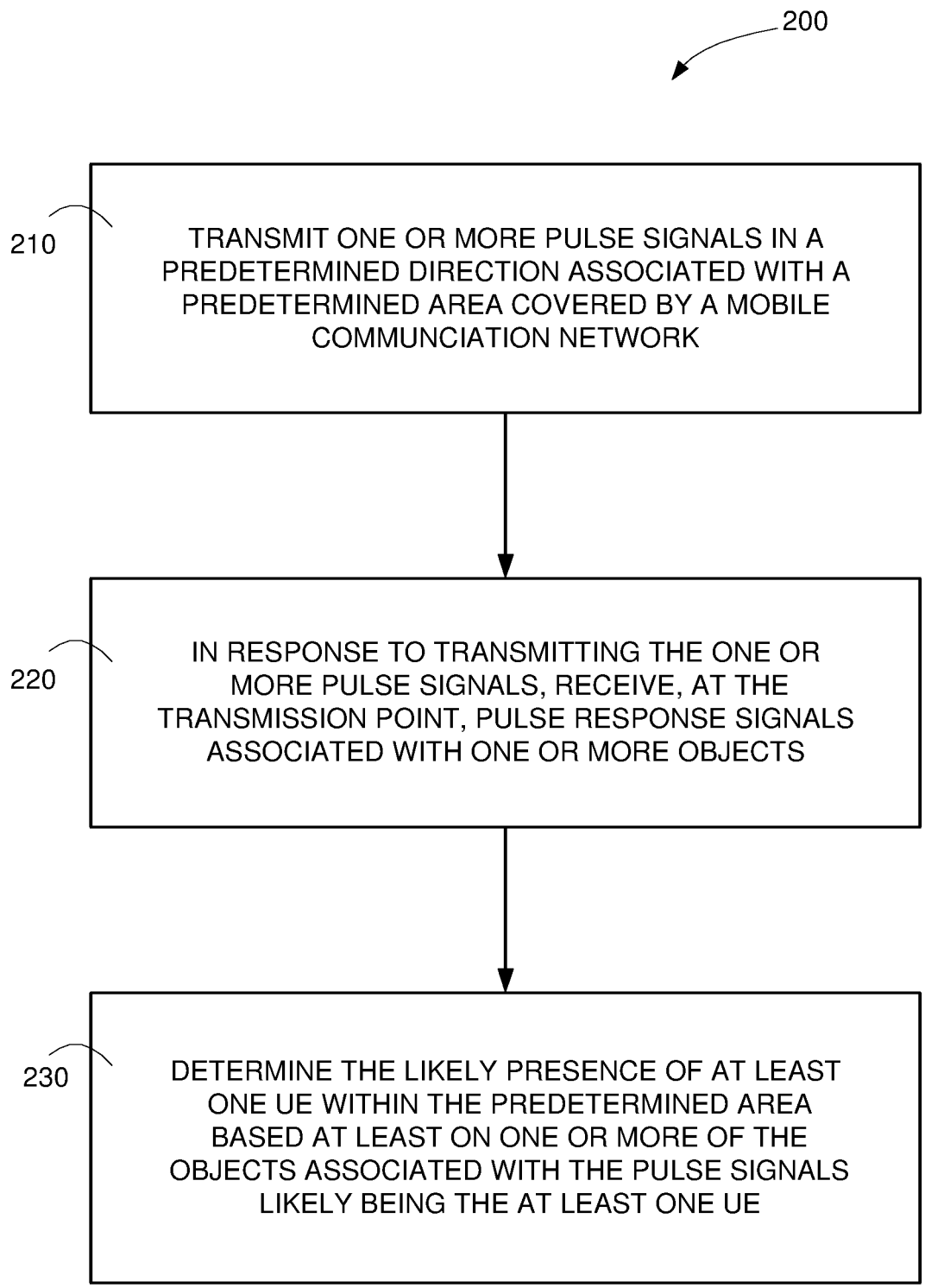

Having thus described embodiments of the invention in general terms, reference will now be made to the accompanying drawings, where:

FIGS. 1-4 are schematic diagrams of a mobile communication network in which two BSs provide coverage to a predetermined network area, in accordance with embodiments of the present invention; and FIG. 5 is a flow diagram of a method for tracking a UE in a mobile communication network by use of pulse signals, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

A mobile device may be referred to as a node or user equipment ("UE"). For the purpose of sending or receiving data, the device may connect to a wireless local area network ("WLAN") or a mobile communication network (including evolution of 3GPP, LTE releases and 5$^{th}$ Generation ("5G") New Radio (NR) releases). Any network described herein may have multiple transmission points. Transmission points may include any node or sub-node capable of transmitting a wireless data stream, including, but not limited to, base stations ("BS"), otherwise referred to as an eNodeB (eNB), gNodeB (gNB), access points ("AP"), radio heads, UEs or the like.

As discussed in detail herein, the present invention provides for methods, apparatus, systems or the like for using radar, or some other form of pulse signals, to track a UE in a mobile communication network by determining the likely presence of a UE (User Equipment) within a predetermined area (e.g., the area at which the pulse signals are directed). In addition to determining the likely presence of a UE within the predetermined area, radar may be used to determine or assist in determining other presence and/or tracking information related to the UE. Such other presence information may include, but is not limited to, the position/location of the UE, the direction of movement of the UE, or rate/speed of movement. Such other tracking information may include, but is not limited to, tracking the position of the UE over time, tracking the direction of movement over time, tracking the rate/speed of the UE over time and the like. In further embodiments of the invention the tracking information may include predicted future state information, such as, but not limited to, future predicted position/location of the UE, future predicted direction of movement of the UE, future predicted speed/rate of movement of the UE and the like. Additionally, the predicted future state information may be associated with a specific future point in time.

As previously mentioned use of pulse signals, such as radar pulses, pilot pulses or the like which allow for determination of the likely presence of a UE and/or tracking information associated with the UE (e.g., position, direction of movement, rate/speed of movement and the like) has the additional benefit of saving beam synchronization power consumption, in that less time and signaling is required in the beam synchronization process than would otherwise be required. Such a power consumption savings, is especially beneficial at the UE, in that, reducing synch power consumption provides for additional battery life.

In specific embodiments of the invention, the information determined and/or obtained as a result of implementing radar tracking in the mobile communication network may provide for generating and storing pulse response (e.g., echo) profiles for a UE, which indicate the likely presence or confirmed presence of UE within a predetermined area over a specified period of time. In other specific embodiments of the invention, the information determined and/or obtained as a result of implementing radar tracking may provide for generating and storing predicted state (e.g., predicted echo) profiles for the UE, which indicate predicted state of the UE, such as, but not limited to, predicted position/location of the UE, predicted direction of movement of the UE, predicted rate/speed of movement of the UE or the like. The predicted state profiles may be associated with a specific future point in time.

In specific embodiments of the invention, the aforementioned methods, apparatus and the like for using radar or other pulse signals in a mobile communication network are especially suitable for use in higher frequency (e.g., mm wave) operating mobile communication networks, such as networks operating at or above 20 GHz (Giga Hertz). Such higher frequency operation is being considered for next generation mobile communication networks, such as 3GPP NR and the like. As previous discussed, while higher frequency operation enables much higher peak data rates, it also presents problems that are not prevalent in lower frequency operation networks. Specifically, the EM-waves behave differently in higher frequency signals, i.e., less scattering occurs and diffraction is reduced, which results in the radiation becoming more directive. As a result of the reflective nature of the higher frequency signals, strong "shadowing" may occur, in which signals do not penetrate objects, such as users or other obstacles that may be positioned between the antenna in the UE and the antenna of a BS. In order to insure that the antenna of a UE has direct line-of-sight with antenna of BS, multiple BSs, multiple radio heads within a single BS or the like need to be employed within a specified area (e.g., cell, sub-cell or the like) in order to cover the area from different angles. Thus, if a user positions themselves such that shadowing results (i.e., the user moves such that they are in the direct line-of-sight of the UE and the connected BS and prevents the signal from reaching the user's UE), another BS, radio head or the like needs to be ready establish a connection with the UE instantaneously so as to insure that that a seamless and transparent handover of the connection occurs between the BSs, radio heads or the like.

Thus, according to specific embodiments of the invention, radar or other forms of pulse signals are used to assist in (more specifically, in certain embodiments accelerate) handover procedures or assist in the re-connection of a connection/link in the event a connection is lost. In this regards, by using radar or other pulse signals to track a UE in a mobile communication network by determining a likely presence of the UE within a specific area of the network, the targeted/neighboring BS, radio head or the like may be informed of the direction within the network (i.e., the specific area) to search for the UE (i.e., the direction at which the beam sweeping operation needs to be pointed). By knowing the direction of the UE and focusing the beam sweep operation in that particular direction, the targeted/neighboring BS, radio head or the like can locate the UE much more faster than it would otherwise (i.e., as a result of sweeping the entire coverage area) and, thus accelerate the handover procedure.

According to embodiments of the present invention, the handover procedure may be defined as any procedure that moves a wireless data stream from one direction to another direction (i.e., from a first antenna to a second antenna). In this regard, the handover may involve any transmission point (TP) (i.e., any apparatus, device or the like having antenna capable of transmitting a wireless data stream). It should be noted that the transmission point may be fixed in terms of location, while in other instance, the transmission point may be mobile or capable of being mobile. Thus, according to embodiments of the invention, the handover may be TP-to-TP, which may include, but is not limited to BS-to-BS, AP-to-AP, BS-to-AP, AP-to-BS or the like. In specific embodiments, such as mesh network environment or the like, the AP may comprise a UE. Additionally, according to specific embodiments of the invention, a BS may comprise multiple transmission points, in the form of radio heads or the like and, as such, the TP-to-TP handover may be internal to the BS (i.e., radio head-to-radio head).

According to specific embodiments of the invention, a transmission point (e.g., BS, AP, radio head or the like) may, in a controlled manner, transmit radar pulses or, in other embodiments some other form of pulse signals. In this regard, the transmission may be sanctioned or otherwise authorized by a wireless communication standard/protocol or the like. In accordance with embodiments of the invention, other forms of pulsed signals may include re-use signals from the communication stream, such as, pilot signals, or the like. For example, a transmission point, such as a BS or the like, performs a beam sweep procedure that is configured to transmit pilot signal pulses in a specific direction (i.e., a predetermined direction within the cell, cell-sector or the like). The pulse signals (i.e., radar signals, re-used pilot signals, or the like are typically, according to embodiments of the invention, transmitted in the same frequency band used to communicate data and/or conduct the beam sweep in order to track the UE position based on the pulse response signal. In other embodiments of the invention, the pulse signals may be configured to be transmitted using a wider frequency band in order to improve the resolution of the pulse signals (i.e., improve the ability to recognize objects). In addition, according to embodiments of the present invention, the pulse signals may be configured to re-use the same beam pattern that is used for data communication. Additionally, the pulse signals may operate on dedicated resources within the operative communication band or, in some embodiments, within a wider frequency bandwidth.

In those embodiments of the invention in which the pulse signals are radar signals, the pulse response signals received in response to transmission of the radar signals are reflective echo signals associated with an object (i.e., the object that reflected the radar signal, which could be a UE, a user, a device, vehicle or the like). In accordance with embodiments of the invention, the transmission point is configured to determine the likely presence of UEs within the predetermined area that the radar signals were directed based the objects associated with the pulse response signals likely being a UE. In this regard, the pulse signals are capable of detecting presence of objects by comparing pulse response signals (e.g., echo signals/profiles) from a first-in-time pulse signal transmission (e.g., radar scan or the like) to a pulse response signals from a second-in-time pulse signal transmission to identify objects that appear in the later pulse signal response signals that were not evident in the earlier pulse response signals. In addition, pulse signals are capable to detecting changes in movement of an object (i.e., tracking movement of an object) and associate areas with movement and/or objects that are usually not present with being a likely UE.

In other embodiments of the invention, in which the pulse signals are pilot signal pulses, the signals are received by UEs located in the predetermined area at which the pilot signal pulses are directed. In specific embodiments of the invention, the UE may be configured to listen for such pulses and use the pulse (i.e., the timing, shape of the pulse, modulated information in the pulse or the like) to determine the direction from which the pulse originated. In response, the UE may reconfigure its antenna to transmit in the same direction that pulse signal was received. For example, in those embodiments of the invention, in which the UE implements digital beamforming, the UE listens for a pilot signal (e.g., a sounding reference signal which is defined in 3 GPP as an up-link pilot or the like) and configures the array to transmit in the direction from which the pulse signal arrived. In other embodiments of the invention, in which the UE implements analog beamforming (i.e., phase shifters that shift phase based on different signals), the UE may be configured to sweep at a faster rate so that when the beam from the BS is present, the UE performs a sweep more rapidly to identify what setting/phase is directed toward the BS and transmits on that setting/phase. In other embodiments of the invention, in response to receiving a pilot signal pulses, the UE may transmit a signal to the BS that announces the presence of the UE and/or initiates a communication link between the UE and the transmission point.

Thus, according to embodiments of the present invention, the transmission point that uses radar or other pulse signals to track or otherwise determines an actual or likely presence of a UE in a specified area is configured to transmit presence and/or tracking information to one or more targeted/neighboring TPs/BSs. The presence and/or tracking information may include any information that the transmission point has determined based at least in part on the pulse response signals received from the UEs or other information acquired as a result of transmitting pulse signals. For example, the presence information may indicate at least one of (i) likely presence of the UE in the predetermined area, (ii) confirmed presence in the predetermined area, and/or (iii) existence of a data connection between the TP and the UE. The movement racking information, which may be communicated the neighboring TPs/BSs, as well as to the UE, may include one or more of (i) tracking a position of the UE, (ii) tracking a direction of movement of the UE, and/or (iii) tracking a rate/speed of movement of the UE. In those embodiments of the invention in which the UE receives the tracking information, the UE may communicate the tracking information to one more other transmission points (e.g., neighboring BSs, APs, UEs or the like). Upon receiving the presence and/or tracking information, the targeted/neighboring TPs/BSs may use the information to increase beam scanning (which may include radar scanning) rates in the predetermined area in which the UE is likely or confirmed to be present. By increasing the beam scanning in the area in which the UE is likely to be or confirmed to be present, the neighboring TPs/BSs can expedite the process of locating the UE and, thus, accelerate a pending handover procedure (i.e., less time is spent locating the UE because the neighboring TP/BS has been informed of the likely or confirmed presence of the UE in the predetermined area and, as a result directs more frequent beam scanning in the direction of the predetermined area).

For example, in those embodiments of the invention in which the pulse signal is a radar pulse, the responsive echo signal may be limited to determining/identifying the likely presence of a UE in the specified area. If the transmission point does not currently have a connection established with the UE, the presence and/or tracking information communicated to the neighboring base stations may be limited to indicating likely presence of a UE and the associated tracking information of the likely UE. In another embodiment of the invention in which the pulse signal is a pilot pulse signal, the UE may respond by announcing their presence in the specified area and, as such, the presence and/or tracking information communicated to the neighboring base stations may indicate a confirmed presence of a UE and the associated tracking information of the UE. In yet another embodiment of the invention, in which the transmission point has an existing connection with the UE, the presence and/or tracking information communicated to the neighboring base stations may indicate that the transmission point has an existing connection with the UE. In a still further embodiment of the invention, in which the pulse response signal identifies a likely presence of a UE in the predetermined and further scanning by the transmission point confirms the presence of the UE in the predetermined area, the presence and/or tracking information communicated to the neighboring base station may indicate a confirmed presence of the UE and the associated tracking information of the UE.

In specific embodiments of the invention, the type of presence and/or tracking information that is communicated to the neighboring TP/BS may be associated with a level of priority. Each level of priority may be associated with a level of increased scanning within the predetermined area where the UE is likely present or confirmed present. For example, if the presence and/or tracking information is limited to indicating that the UE is likely present in the predetermined area, such information may be associated with a lowest priority and, as a result, beam sweeping, (which may include radar scanning) in the predetermined area is increased by a lowest amount. If the presence and/or tracking information indicates that the UE is confirmed present in the predetermined area (for example, by receiving a signal from the UE announcing presence), such information may be associated with a higher level of priority and, as a result, beam sweeping, (which may include radar scanning) in the predetermined area is increased by a higher amount (i.e., an amount higher than the lowest amount associated with the UE being likely (but not confirmed) present in the predetermined area. However, if the presence and tracking information indicates that the UE has an established connection with the TP (i.e., confirmed presence assumed), such information may be associated with a highest level of priority and, as a result beam sweeping, (which may include radar scanning) in the predetermined area is increased by a highest amount deemed necessary.

In conventional beam sweeping practice, a TP/BS transmits in a first direction and listens in that first direction for a predetermined period of time for a responding UE and then transmits in a second direction and listens for a predetermined period of time for a responding UE and so on until the TP/BS has transmitted and listened in all directions. However, in the event that a TP/BS knows that a UE is in a particular area (such as in accordance with embodiments of the present invention, in which radar/pulse signals are used to determine that a UE is likely present in a particular area), that particular area may be swept more frequently or with higher granularity to hasten the identification of the UE and, thus, accelerate any pending handover procedure. In one specific example embodiment of the invention, increasing beam sweeping in a predetermined area (i.e., the area where the UE is likely or confirmed to be present) may be include sweeping in the predetermined area for a predetermined period of time, followed by sweeping a certain percentage of the entire coverage area (e.g., 10%, 20% or the like), followed by sweeping again in the predetermined area for a predetermined period of time, followed by a next certain percentage of the entire coverage area (e.g., the next 10%, the next 20% or the like) and so on.

Referring to FIGS. 1-4 a mobile communication network 100 is shown in which two TP/BSs 110 and 120 are capable of providing coverage to UE 130 located within a predetermined area 140 (e.g., cell, cell sector or the like) of the communication network 100, in accordance with embodiments of the present invention. The mobile communication network 100 may, according to specific embodiments of the invention, comprise a high frequency operating communication network (e.g., a frequency at or above 20 GHz or the like). As previously discussed such high frequency communication networks are prone to shadowing and, therefore, may require multiple TP/BSs in order to insure that a UE has coverage in the event shadowing occurs and the connection is either impaired or lost. In the embodiments shown in FIGS. 1-4, two TP/BSs 110 and 120 are shown by way of example; however it should be understood that, predetermined area 140 may be served by more than two BSs.

Figure 1:
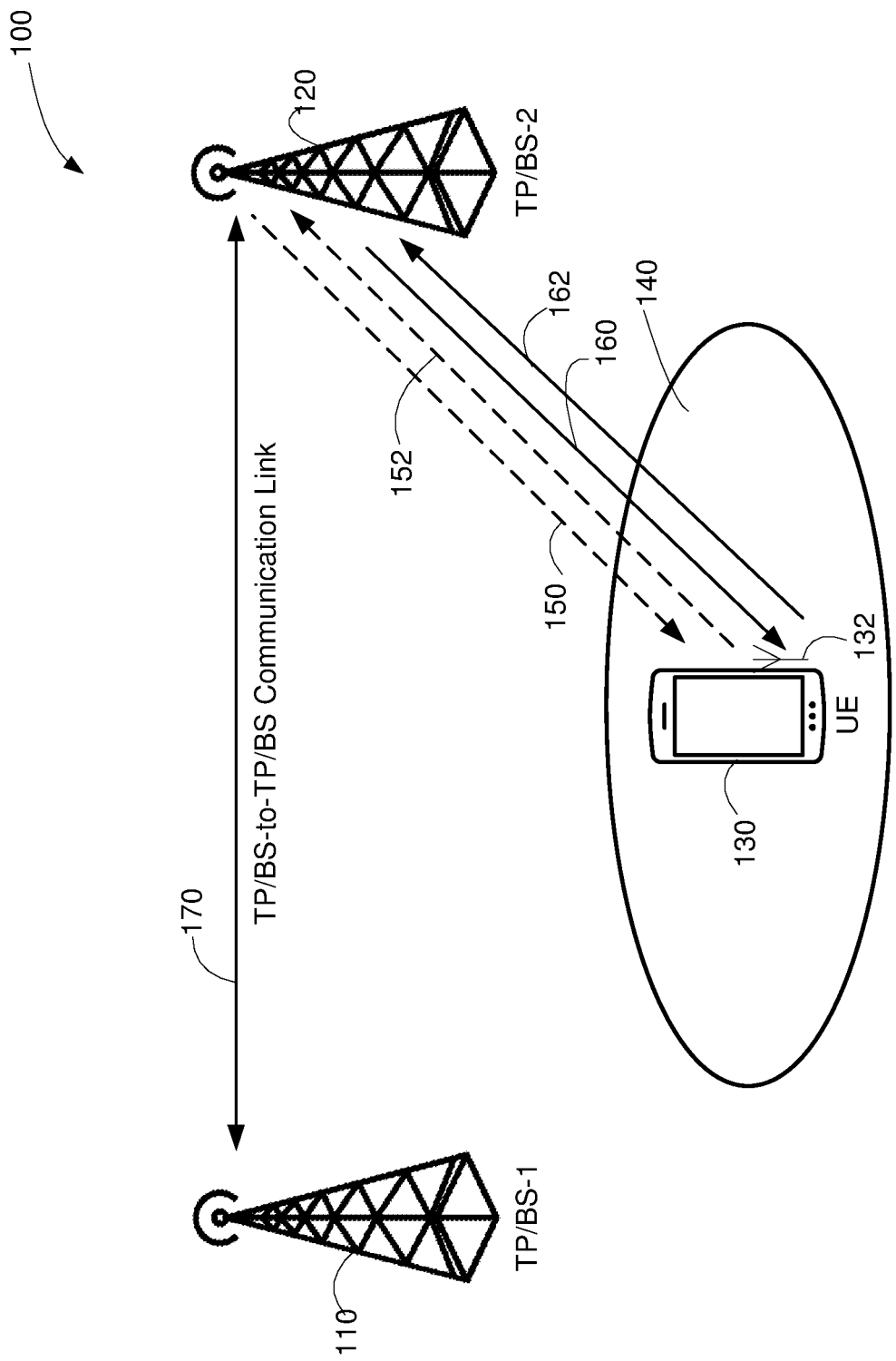

In the mobile communication network 100 shown in FIG. 1, TP/BS-2 120 is shown as transmitting pulse signals 150 in a predetermined direction of the predetermined area 140 and, in response to transmitting the pulse signals 150, receive pulse response signals 152 from objects that receive or otherwise reflect the pulse signals 150. While FIGS. 1-4 are limited to depicting the UE 130 as the only object in the predetermined area 140 that responds to the pulse signal 150, in reality, many more objects (UEs, users, vehicles, devices and the like) may be disposed within the predetermined area 140 and receive and respond to the pulse signal. As such, in accordance with embodiments of the present invention, the TP/BS-2 120 is further configured to determine, based on the pulse response signals 152, the likely presence of the UE 130 within the predetermined area 140 based at least on one or more of the objects associated with the pulse response signals likely being the at least one UE 130.

Moreover, while, FIGS. 1-4 is limited to showing TP/BS-2 120 as transmitting pulse signals 150, in many embodiments of the invention, most, if not all, of the TPs/BSs in the mobile communication network, including TP/BS-1 110 and the like are configured to transmit pulse signals and receive corresponding pulse response signals. In addition, in order to more readily determine the direction to transmit the pulse signals and/or the direction from which pulse responses are received, the plurality of antenna included within the TPs/BSs are configured in a systematic non-arbitrary order, such as in an array or the like.

As previously discussed, pulse signals 150 may comprise radar pulses and/or re-used communication signals, such as pilot signal pulses, or the like. In those embodiments in which the pulse signal 150 is a radar pulse, the pulse response signal 152 is a reflective echo signal echoing from the objects that are exposed to the pulse signal. In other embodiments of the invention, in which the pulse signal 150 is a re-used communication signal, such as pilot signal pulses, (e.g., sounding reference signal pulses as defined in 3GPP or the like), the pulse response signal may include a signal from the UE 130 that announces the presence of the UE and/or initiated a communication link with the TP/BS-2 120. In such embodiments of the invention, the UE may use the pulse in the pilot signal to determine the direction from which the pulse came, so that the UE can send the pulse response signal back to the TP/BS-2 120 in the same direction. In addition, in those embodiments of the invention in which the pulse signal 150 comprises a re-used communication signal, such as pilot signal pulses, the pulse signal 150 may comprise additional information, such as timing informing or other modulated data that is instrumental for determine response direction and/or response timing.

In the illustrated embodiment of FIG. 1, TP/BS-2 has a data connection established with UE 130, as illustrated by downlink connection 160 and uplink connection 162. The data connection 160, 162 with the UE and TP/BS-2 120 is established based on the antenna 132 in the UE 130 having a direct line-of-sight with the TP/BS-2 120 (i.e., the body of the UE 130, or any other objects, such as the user (not shown in FIG. 1) of the UE are not positioned between the antenna 132 and the TP/BS-2 120. It should be noted that while FIG. 1 depicts UE 130 and TP/BS-2 120 as having a data connection 160 and 162, a data connection, is not required for the TP/BS-2 to transmit pulse signals 150 and/or use such pulse signals to track the UE within the predetermined area 140. Additionally, according to embodiments of the invention in which the pulse signal 150 is a re-used communication, such as a pilot signal pulse the data connection 160, 162 may be established based on the pulse signal response 152, which may be configured to include initiation of a data connection between the UE 130 and the TP/BS-2 120.

In addition, as shown in FIGS. 1-4 a direct communication link 170 is established between TP/BS-1 110 and TP/BS-2 120. Such a communication link 170 allows for the neighboring TPs/BSs to communicate information associated with the transmission of pulse signals 150 for the purpose of assisting (i.e., accelerate or the like) in handovers procedures. As previously discussed in those embodiments of the invention in which the pulse signals 150 are radar signals and the TP/BS-2 120 does not have a data connection established, the TP/BS-2 may communicate presence/tracking information that indicates, at a minimum, the likely presence of the UE 130 in the predetermined area 140. Additionally, the presence/tracking information may include other tracking information related to the likely present UE, such as position of the UE, direction of movement of the UE, rate/speed of movement of the UE, predicted future position of the UE, predicted future direction of movement of the UE, predicted future rate/speed of the UE and the like. In those embodiments of the invention in which the pulse signals 150 are re-used communication signals, such as pilot signal pulses and the TP/BS-2 120 does not have a data connection established, the TP/BS-2 may communicate presence/tracking information that indicates, at a minimum, a confirmed presence of the UE 130 in the predetermined area 140 based on the pulse response signal received from the UE indicating/confirming the UE's presence in the predetermined area 140. Additionally, as described above, the presence/tracking information may include other tracking information related to the confirmed present UE. Moreover, in those embodiments in which the TP/BS-2 120 has an established link with the UE 130, the TP/BS-2 120 may communicate presence/tracking information that indicates the confirmed presence and the established communication link, along with any other heretofore described tracking information related to the confirmed present UE. The presence and tracking information provides TP/BS-1 110 knowledge of the direction in which the UE 130 is present or is likely to be present. In response to receiving such information, TP/BS-1 110 may increase the frequency of beam scanning in this known direction/predetermined area, so as to expedite locating the UE 130 for the purpose of establishing a data connection with the UE 130.

Figure 2:
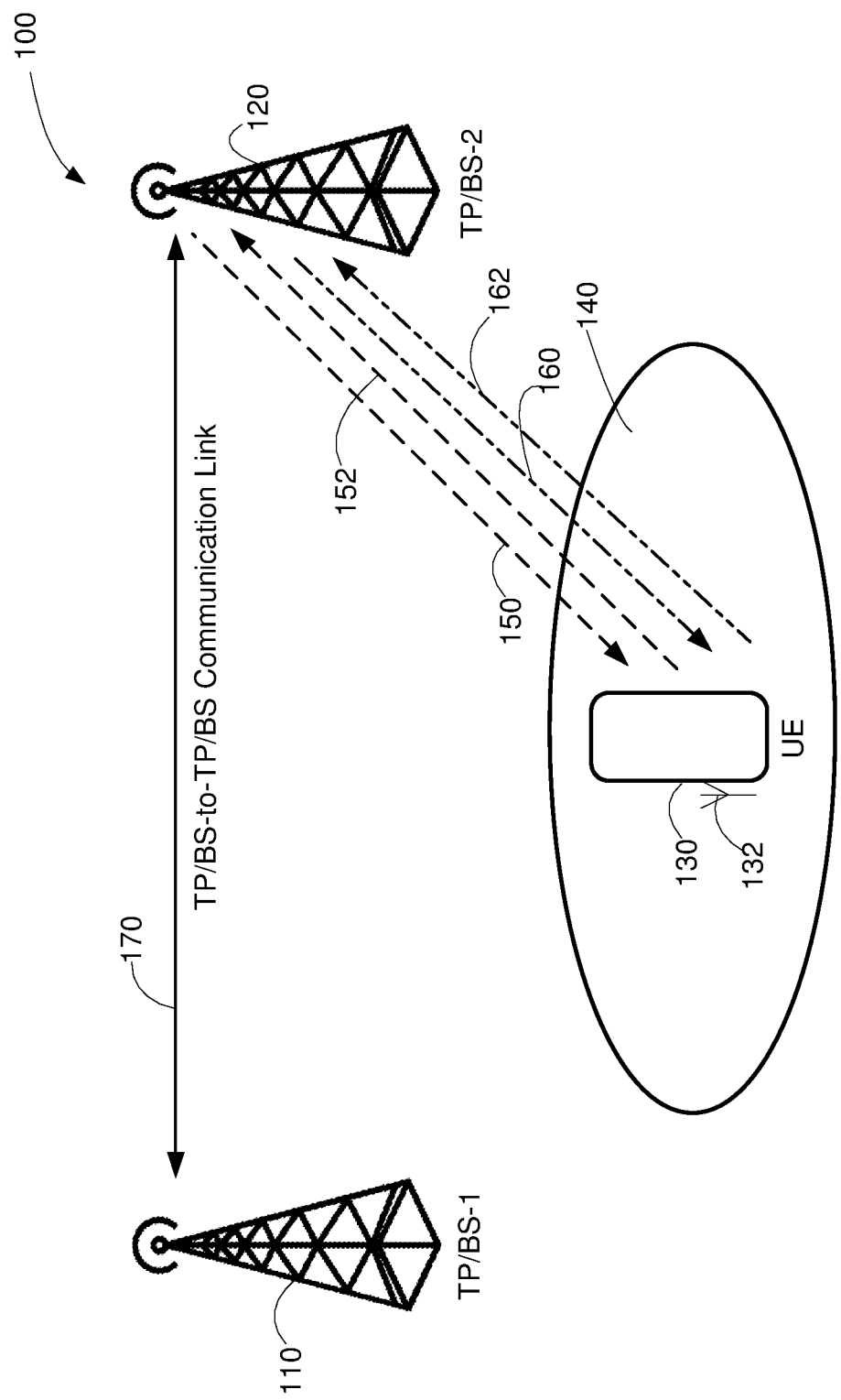

Referring to FIG. 2, the UE 130 has changed position (i.e., turned 180° around in direction), such that the antenna 132 of the UE 130 is no longer in direct line-of-sight of the TP/BS-2 120. As previously described, in higher frequency operation (i.e., at or above 20 GHz) shadowing may occur when the TP/BS-2 120 is no longer in direct-line-sight with the antenna 133 of the UE 130. In the illustrated embodiment of FIG. 2, the direct-line-sight between the TP/BS-2 120 and the antenna 132 of the UE 130 is interrupted by the body of the UE itself; however, in other instances objects, such as the user of the UE 130 or other impediments may cause a disconnect in the direct line-of sight between the antenna 132 of the UE 130 and the TP/BS-2 120. In the embodiment shown in FIG. 2, the shadowing (i.e., loss of direct line-of-sight) has resulted in a deteriorated communication link 160 and 162, as denoted by the broken line arrows 160 and 162; however, in other instances such shadowing may result in a loss of the communication link 160 and 162 (i.e., the communication link is dropped). In the embodiment shown in FIG. 2, a handover procedure that establishes a direct communication link between the TP/BS-1 110 and the UE 130 may be imminent due to the deteriorated communication link 160 and 162.

Referring to FIG. 3, as a result of the deteriorated communication link 160 and 162 between the TP/BS-2 120 and the UE 130 (shown in FIG. 2), a handover procedure has been implemented that has resulted in a communication link 180, 182 being established between TP/BS-1 110. As shown in FIG. 3 TP/BS-1 has a direct line-of sight between the antenna 132 of UE 130 and the TP/BS-1. In accordance with embodiments of the invention, the handover procedure has been assisted (e.g., accelerated) or the like by the pulse signal data (i.e., the presence and tracking information) communicated from the TP/BS-2 120 to TP/BS-1 110. Specifically, the pulse signal response has indicted the likely presence of the UE 130 in the predetermined area (which may be confirmed as the actual presence based on the UE 130 announcing their presence or a data connection between the UE 130 and the TP/BS 120) and such information is subsequently communicated from the TP/BS-2 120 to the TP/BS-1 110. Such information provides TP/BS-1 knowledge as to the direction in which to look for the UE 130 and, as such, scanning in that direction/area occurs more frequently. As a result, UE 130 is located and identified by the TP/BS-1 110 more rapidly than it would have been absent the more frequent directed beam scanning in that direction/area, and, thus, handover occurs in an accelerated manner.

Referring to FIG. 4, shown is a mobile communication network in which passive radar is implemented, according to embodiments of the present invention. Unlike active radar, which is depicted and described in relation to FIGS. 1-3, passive radar provides for the pulse response signal (i.e., echo signal) to not only be reflected back 152 to the pulse signal transmitter (i.e., TP/BS-2 120) but also reflected back 152 to other neighboring TPs/BSs, such as TP/BS-1 110. In such embodiments of the invention, TP/BS-2 120 is configured to communicate pulse signal transmission parameters/settings to TP/BS-1 110 in order for TP/BS-1 110 to able to use the pulse response signal 152 in determining the likely presence of the UE 130 in the predetermined area 140 and/or track the UE 130 in the predetermined area 140.

Referring to FIG. 4 a flow diagram is presented of a method 200 for tracking a UE in a predetermined area of a mobile communication network, in accordance with embodiments of the present invention. In specific embodiments of the invention, the mobile communication network is further defined as a network operating at a frequency at or above 20 GHz. At Event, 210, one or more pulse signals are transmitted from a Transmission Point (TP) in a predetermined direction associated with a predetermined area covered by the mobile communication area. As previously discussed, the pulse signals may comprise radar pulses or re-used communication signals, such as pilot signal pulses, or the like. In specific embodiments of the method, the pulse signals might be transmitted at the same frequency as the operating frequency of the mobile communication network (i.e., the same frequency at which beam scanning occurs and/or data is communicated) in order to track the UE position based on the pulse signal responses. In other specific embodiments of the method, the pulse signals are transmitted at a wider frequency range than the operating frequency of the mobile communication device. The TP may comprise a base station, an access point, a radio head, a UE or any other apparatus or device configured to transmit a wireless data stream.

At Event 220, in response to transmitting the one or more pulse signals, pulse signal responses are received at the TP that are associated with one or more objects. In those embodiments in which the pulse signals are radar pulses, the pulse response signals are echo signals reflected off of objects that "hear" the radar pulses. In those embodiments in which the pulse signals are re-used communication signals (e.g., pilot signal pulses, or the like), the pulse response signals may additional include response signals from the UEs that are configured to announce the presence of the UE in the predetermined area and, in some embodiments, initiate a connection between the TP and the UE.

At Event 230, the likely presence of at least one UE within the predetermined area is determined/identified based at least one the one or more objects associated with the pulse signal likely being the at least one UE. In further specific embodiments of the method, the likely presence of the UE may be confirmed presence based on at least one of (i) receiving a signal from the UE that announces the UE's presence in the predetermined area and/or initiates a connection between the TP and the UE and/or (ii) a communication link existing between the UE and the TP.

In additional embodiments of the method, the pulse response signals are used to determine and/or track a location of the UE, a direction of movement of the UE and/or a rate/speed of the UE. In further related embodiments of the Method, the pulse response signals are used to predict one or more of a future location of the UE, a future direction of movement of the UE and/or a future rate/speed of the UE. In such embodiments the method may further comprise generating and storing in memory pulse response profiles (e.g., echo profiles) that indicate the likely presence of a UE and/or track the likely or confirmed presence of the UE over time. In further related embodiments the method may further comprise generating and storing in memory predicted pulse response profiles (e.g., predicted echo profiles) that indicate the predicted future presence of a UE in the predetermined area and/or track the predicted future state (e.g., position, direction of movement, rate of movement or the like) of the UE over time.

In further embodiments the method includes assisting in TP-to-TP handover of the one of the UE based on the pulse response signals. TP-to-TP handover is defined herein as moving a wireless data stream from one direction to another direction, such as BS-to-BS, AP-to-AP, radio head-to-radio head and the like. In specific embodiments of the method, assisting in the TP-to-TP handover of the UE includes communicating presence and/or tracking information from the TP to neighboring TPs. The presence and/or tracking information indicates at least one of (i) likely presence of the UE within the predetermined area, (ii) confirmed presence of the UE in the predetermined area and/or (iii) a communication link existing between the UE and the TP. In further embodiments of the method assisting in the TP-to-TP handover further includes increasing the beam sweep frequency in the direction of the predetermined area based on the likely or confirmed presence of the UE in the predetermined area. Such increasing of the beam sweep frequency may comprises increasing the frequency of transmission of one or more pulse signals in the predetermined direction based on the likely or confirmed presence of the UE in the predetermined area.

Thus, systems, devices, methods, computer program products and the like described above provide for the use of radar signals or some other pulse signal transmission as a means for tracking the position and/or movement of a UE within a mobile communication network by determining the likely presence of UE in a predetermined area. As a result of implementing radar or the like to determine the likely presence and/or track the presence/position of a User Equipment (UE), such presence/tracking information may be used to expedite a handover or establish re-connection within the communication network. In this regard, more targeted beam sweeps or more frequent beam sweeps, which may include the pulse signals, can be made in the direction where the UE has been determined to be present in order to accelerate the establishment of the communication link between the targeted transmission point, such as a Base Station (BS) or the like or reconnection to the existing transmission point.

Each processor, transmission point/BS and/or UE described herein generally includes circuitry for implementing audio, visual, and/or logic functions. For example, the processor/transmission point/UE may include a digital signal processor device, a microprocessor device, and various analog-to-digital converters, digital-to-analog converters, and other support circuits. Control and signal processing functions of the system in which the processor resides may be allocated between these devices according to their respective capabilities. The processor/transmission point/UE may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, according to specific embodiments of the invention, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, one or more machines, devices, computer program products, and/or the like), as a method (including, for example, computer-implemented process, and/or the like), as a system (including for example, multiple disparate machines, devices and the like) or as any combination of the foregoing. Accordingly, embodiments of the present invention may take the form of an entirely an entirely software embodiment (including firmware, resident software, micro-code, stored procedures, etc.), an entirely hardware embodiment, or an embodiment combining software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory ("ROM"), an erasable programmable read-only memory ("EPROM" or Flash memory), a compact disc read-only memory ("CD-ROM"), and/or some other tangible optical and/or magnetic storage device.

One or more computer-executable program code portions for carrying out operations of the present invention may include object-oriented, scripted, and/or unscripted programming languages, such as, for example, JAVA, PERL, SMALLTALK, C++, SAS, SQL, PYTHON, Objective C, JAVASCRIPT, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for tracking a User Equipment (UE) in a mobile communication network, the method comprising:
    transmitting, from a transmission point, one or more pulse signals in a predetermined direction associated with a predetermined area covered by the mobile communication network;
    in response to transmitting the one or more pulse signals, receiving, at the transmission point, pulse response signals associated with one or more objects;
    determining a degree of presence of at least one UE within the predetermined area based at least on one or more of the objects associated with the pulse response signals likely being the at least one UE, and
    communicating presence information indicating the degree of presence of the at least one UE within the predetermined area to one or more other transmission point, wherein the presence information is associated with a level of priority based on the degree of presence of the at least one UE within the predetermined area, the level of priority being associated with a level of beam scanning within the predetermined area;
    wherein the determining the degree of presence includes selecting from (i) likely presence of the one of the UE within the predetermined area, (ii) a confirmed presence of the one of the UE within the predetermined area, and (iii) an indication that the transmission point has an existing communication link with the one of the UE.

2. The method of claim 1, wherein transmitting the one or more pulse signals further comprises transmitting, from the transmission point, radar pulses in the predetermined direction associated with the predetermined area.

3. The method of claim 1, wherein transmitting the one or more pulse signals further comprises transmitting, from the transmission point, pilot signal pulses in the predetermined direction associated with the predetermined area.

4. The method of claim 1, further comprising confirming a presence of the at least one UE in the predetermined area based on at least one of (i) receiving a signal from the at least one UE that indicates the presence of the at least one UE in the predetermined area or initiates a communication link between the at least one UE and the transmission point, or (ii) a communication link existing between the at least one UE and the transmission point.

5. The method of claim 1, wherein the mobile communication network further comprises a mobile communication network operating at or above a frequency of 20 Gigahertz (GHz).

6. The method of claim 1, wherein the one or more pulse signals are transmitted at a same frequency as an operating frequency of the mobile communication network.

7. The method of claim 1, wherein the one or more pulse signals are transmitted at a wider frequency range than an operating frequency of the mobile communication network.

8. The method of claim 1, wherein the transmission point comprises one of a base station, an access point, a radio head or a mobile device.

9. The method of claim 1, further comprising determining a physical location of the at least one UE based at least in part on the pulse response signals.

10. The method of claim 1, further comprising determining a direction of movement of the at least one UE based at least in part on the pulse response signals.

11. The method of claim 1, further comprising tracking a movement of at the at least one UE based at least in part on the pulse response signals.

12. The method of claim 1, further comprising predicting a future state of the at least one UE based at least in part on the pulse response signals.

13. The method of claim 1, further comprising generating and storing one or more UE pulse response profiles for the at least one UE based on the pulse response signals, wherein the pulse response signals profiles indicate a likely presence of the at least one UE within the predetermined area over time.

14. The method of claim 1, further comprising generating and storing a predicted UE pulse response profile for the at least one UE based at least on tracking the received pulse response signals over time.

15. The method of claim 1, further comprising assisting in transmission point-to-transmission point handover of one of the UE based on the pulse response signals, wherein transmission point-to-transmission point handover is defined by a wireless data stream being moved from a first direction to a second direction.

16. The method of claim 1, further comprising communicating movement tracking information from the transmission point to at least one of (i) one or more other transmission points and (ii) the UE, wherein movement tracking information includes one or more of tracking a position of the UE, tracking a direction of movement of the UE and tracking a rate of movement of the UE.

17. The method of claim 1, further comprising assisting in re-connecting one of the UE to the transmission point based on the pulse response signals.

18. A transmission point apparatus for tracking a User Equipment (UE) in a mobile communication network, the apparatus comprising:
a memory;
at least one processor in communication with the memory;
a plurality of antenna configured for (i) transmitting one or more pulse signals in a predetermined direction associated with the predetermined area, and (ii) in response to transmitting the one or more pulse signals, receiving pulse response signals associated with one or more objects;
a module stored in a memory, executable by the processor and configured to determine a degree of presence of at least one UE within the predetermined area based at least on one or more of the objects associated with the pulse response signals likely being the at least one UE; and
a communication link configured to communicate presence information indicating the degree of presence of the at least one UE within the predetermined area to one or more other transmission point, wherein the presence information is associated with a level of priority based on the degree of presence of the at least one UE within the predetermined area, the level of priority being associated with a level of beam scanning within the predetermined area;
wherein the module is configured to determine the degree of presence by selecting from (i) likely presence of the one of the UE within the predetermined area, (ii) a confirmed presence of the one of the UE within the predetermined area, and (iii) an indication that the transmission point has an existing communication link with the one of the UE.

19. A system for tracking a User Equipment (UE) within a mobile communication network, the system comprising:
at least one UE located within a predetermined area of the mobile communication network;
a transmission point comprising a plurality of antenna configured for (i) transmitting one or more pulse signals in a predetermined direction associated with the predetermined area, and (ii) in response to transmitting the one or more pulse signals, receiving pulse response signals associated with one or more objects;
a module stored in a memory, executable by a processor and configured to determine a degree of presence of the least one UE within the predetermined area based at least on one or more of the objects associated with the pulse response signals likely being the at least one UE; and
a communication link configured to communicate presence information indicating the degree of presence of the at least one UE within the predetermined area to one or more other transmission point, wherein the presence information is associated with a level of priority based on the degree of presence of the at least one UE within the predetermined area, the level of priority being associated with a level of beam scanning within the predetermined area;
wherein the module is configured to determine the degree of presence by selecting from (i) likely presence of the one of the UE within the predetermined area, (ii) a confirmed presence of the one of the UE within the predetermined area, and (iii) an indication that the transmission point has an existing communication link with the one of the UE.

* * * * *